United States Patent [19]

Pazzaglia

[11] Patent Number: 4,614,293
[45] Date of Patent: Sep. 30, 1986

[54] SHAPING DEVICE FOR CYLINDRICAL CONTAINERS FOR USE WITH A CONTINUOUS WELDER

[75] Inventor: Luigi Pazzaglia, Bologna, Italy

[73] Assignee: CEFIN S.p.A., Bologna, Italy

[21] Appl. No.: 736,324

[22] Filed: May 21, 1985

[30] Foreign Application Priority Data

Jun. 22, 1984 [IT] Italy ................... 3499 A/84

[51] Int. Cl.⁴ ............................................. B23K 37/04
[52] U.S. Cl. .................................... 228/17; 72/52; 72/178; 228/17.5
[58] Field of Search ............. 72/51, 52, 178, 181, 72/236, 368; 228/17.5, 147, 150, 151, 17

[56] References Cited

U.S. PATENT DOCUMENTS

| | | | |
|---|---|---|---|
| 471,301 | 3/1892 | Keene | 72/178 |
| 812,285 | 2/1906 | McElroy | 72/51 X |
| 2,249,592 | 7/1941 | Anderson | 228/151 |
| 2,977,914 | 4/1961 | Gray et al. | 72/178 X |
| 3,236,083 | 2/1966 | Linderoth et al. | 228/17 X |
| 3,379,044 | 4/1968 | Kirschner | 72/236 |
| 3,431,383 | 3/1969 | Ullery et al. | 228/17 X |
| 4,299,108 | 11/1981 | Kato et al. | 72/178 |

FOREIGN PATENT DOCUMENTS

| | | | |
|---|---|---|---|
| 3017040 | 11/1981 | Fed. Rep. of Germany | 228/151 |
| 560663 | 6/1977 | U.S.S.R. | 72/52 |

*Primary Examiner*—E. Michael Combs
*Attorney, Agent, or Firm*—Balogh, Osann, Kramer, Dvorak, Genova & Traub

[57] ABSTRACT

The device comprises several sets of shaped rollers disposed on parallel circumferences. The rollers of one of said sets are gauged and innerly define a circumference the diameter of which is equal to that of the cylindrical box-shaped elements to be shaped. In order to ensure a perfect welding of the cylindrical box-shaped elements, some of the gauged rollers are powered at a constant speed. These powered gauged rollers mesh with each other by means of their respective toothing and only one of them is powered by a powered toothed belt which moves the welded box-shaped elements away from the shaping device.

3 Claims, 2 Drawing Figures

U.S. Patent  Sep. 30, 1986  4,614,293
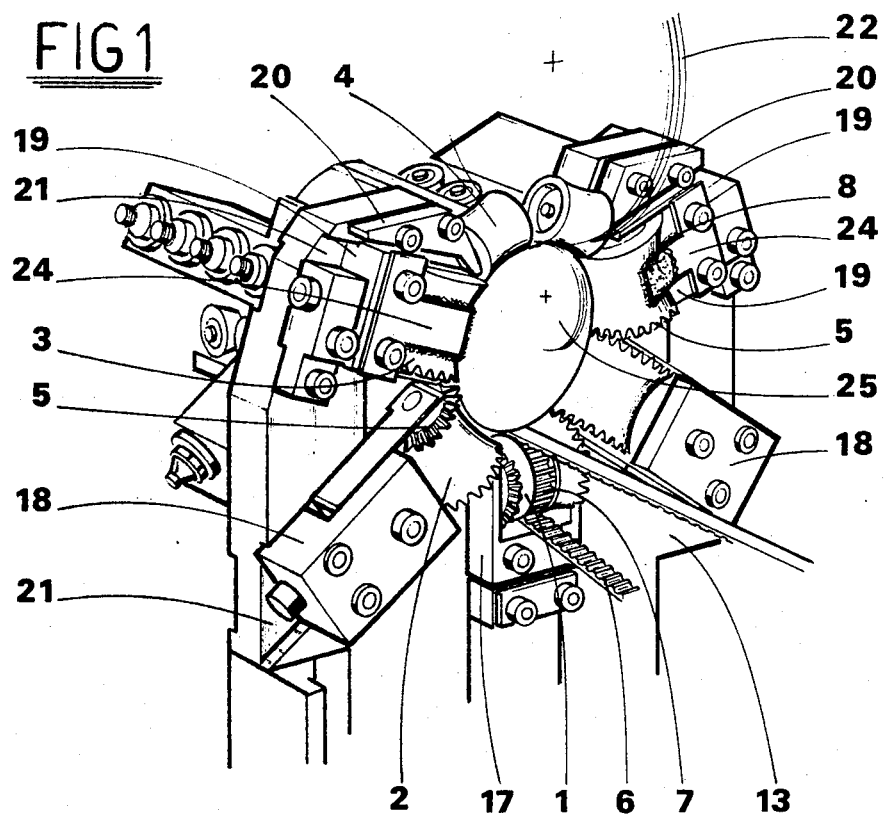
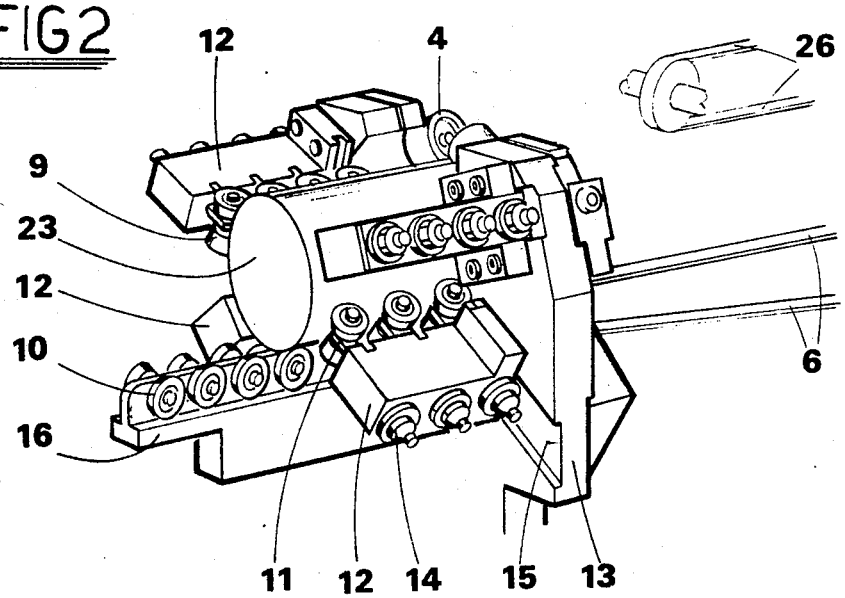

SHAPING DEVICE FOR CYLINDRICAL CONTAINERS FOR USE WITH A CONTINUOUS WELDER

FIELD OF THE INVENTION

The invention relates to a device for shaping cylindrical box-shaped elements to a standard size, suitable to be applied to a continuous welder.

BACKGROUND OF THE INVENTION

Generally the most important requirement for continuous welders is to be fed in so that the highest continuity and regularity may be reached.

Also and above all in welders of the above mentioned kind this requirement is of fundamental importance: in fact a small increase or decrease in the welding rate would involve the melting of the material to be welded or a non-welding respectively.

In the case of continuous welders for cylindrical box-shaped elements usually called cans, the tin plates that will form the cylindrical part of the cans are fed in along a horizontal arm. Along said arm the tin plates are first calendered then they are caused to advance by a toothed entraining chain until they are under a fork-shaped element. This fork-shaped element removes the cans from the entraining teeth of the chain and pushes them into a shaping device until they are in engagement with two disk electrodes.

The shaping device comprises several sets of shaped rollers disposed on parallel circumferences and one of said sets, usually the last, consists of gauged rollers the inside of which defines a circumference having the same diameter as the cans to be shaped.

Therefore the two disk electrodes simultaneously carry out the welding and cause the cans to advance towards a pair of entraining belts the task of which is of moving them away. As a result, the setting of the disk electrodes, which have to fulfil the two above mentioned functions, is very difficult and subjected to variations. As already said, these variations may give rise to the melting of the material of which the tin plates are made if there is a slackening of speed and therefore the tin plates stop longer than necessary between the electrodes, or a non-welding of the edges if they move at too high a speed thereby stopping for a shorter time than the required one.

In both cases the cans do not appear completely welded and the product contained therein might be subjected to deteriorations that in the case of food could even be lethal.

OBJECTS

The technical task at the basis of the invention is therefore to accomplish a shaping device in which the tin plates that will form the cans are caused to advance at a rigorously constant and uniform speed.

Within the scope of this technical task it is an important object of the present invention to provide a shaping device structured in such a way that the electrodes mainly fulfil the only welding function.

A further object of the invention is to provide a shaping device which is also capable of a perfect and functional operation while having a relatively low manufacturing cost.

SUMMARY OF THE INVENTION

The foregoing technical task and objects are achieved by a device for shaping cylindrical box-shaped elements to a standard size, suitable to be applied to a continuous welder consisting of several sets of shaped rollers, each set of rollers being disposed along a circumference, the rollers of at least one of said sets being gauged and innerly defining a circumference having the same diameter as the cylindrical box-shaped elements to be shaped, wherein one or more of said gauged rollers are powered at a constant speed.

The main advantage attained by this shaping device resides, as intended, in the achievement of a perfectly constant and uniform feed speed of the tin plates.

According to a further feature of the device, a further advantage consists in that the entraining belt powering the gauged rollers increases the friction between the cans and the driving members and therefore prevents the cans from sliding on the powered gauged rollers.

According to a still further feature of the device the friction is also increased by the presence of cleaning elements having the task of keeping the surface of the powered gauged rollers clean.

BRIEF DESCRIPTION OF THE DRAWINGS

The above depicted advantages and characteristics will become more apparent from the following detailed description of a preferred embodiment given by way of example only with reference to the accompanying drawings, in which:

FIG. 1 is a perspective front view of the main members of the shaping device in question;

FIG. 2 is a perspective back side view of the same device.

DESCRIPTION OF THE PREFERRED EMBODIMENT

As shown in FIG. 1, a shaping device consists of a set of shaped gauged rollers 1, 2, 3, 4, several sets of shaped containing rollers 9 and a set of shaped support rollers 10.

Each set of containing rollers 9 is disposed in a plane at right angles to the feed direction of the cans 23 and consists of a set of rollers located symmetrically two by two at the two opposed sides of one end of a rod 11. Each rod 11 crosses one of four horizontal blocks 12 supported by and projecting from a vertical plate 13 and a spring not shown is fitted on said rod 11, inside the block 12.

At the other end, projecting from block 12, of each rod 11 a stop nut 14 is screwed in contrast to the action of said inner spring. Each block 12 is engaged in an adjustable manner with a guide groove 15 provided on the plate 13.

The support rollers 10 which have the same shape as the containing rollers 9 are located at a lower position than the containing rollers 9 and are symmetrically disposed at the two opposed sides of the vertical arm of a horizontal overturned T-shaped beam 16 supported by and projecting from the plate 13.

The containing rollers 9 and the support rollers 10 therefore define a cylinder the diameter of which varies depending upon the deformation of the springs fitted on the rods 11. The cylinders defined by rollers 9 and 10 have a common lower generating line determined by the support rollers 10.

On the contrary, the shaped gauged rollers 1, 2, 3, 4 are each supported by a corresponding block 17, 18, 19 and 20 and these blocks are in turn supported by the plate 13 on the side thereof opposite the one from which the blocks 12 and beam 16 project. Each block 17, 18, 19 and 20 can be moved in an adjustable manner at right angles to the axis of the corresponding gauged rollers 1, 2, 3 and 4 along a respective guide groove 21 provided on plate 13.

The gauged rollers 1, 2 and 3, which are mutually equal, are bigger than the other gauged rollers 4, which are also equal to each other, and they are located in an underneath position; furthermore they are supported at the ends of corresponding arms provided on each respective block 17, 18, 19 while the upper rollers 4 are supported by and projecting from the respective blocks 20. The upper gauged rollers 4 are smaller in size in order to allow the passage therebetween of the upper electrode 22 of the welder.

The position of the gauged rollers 1, 2, 3 and 14 is defined by aligning the gauged roller 1 with the support rollers 10.

In conformity with the invention, the gauged rollers 1, 2 and 3 shown in the accompanying drawing are powered in the following manner.

On each cross side wall of rollers 1 and 2 and on a single wall of rollers 3 a peripheral toothing 5 has been obtained so that each lower gauged roller 1, 2 or 3 meshes with the adjacent one or ones. On the contrary, on the central gauged surface of the lower roller 1 a toothing 7 has been provided, adapted to be engaged by the teeth of a toothed belt 6 powered at a constant speed equal to the feed speed of cans 23. In this way the gauged roller 1 is powered by the toothed belt 6 and it powers the other lower gauged rollers 2 and 3 at the same speed.

A metal strap 24 is applied in a detachable manner to each block 19; it carries a felt element 8 at its lower part which is constantly kept in contact with the gauged surface of the respective gauged roller 3.

For a best understanding of the operation, it has been also indicated in FIG. 1 the lower electrode 25 and in FIG. 2 a belt 26 located above the toothed belt 6.

In a so structured shaping device the cans 23 are caused to move forward until they engage between the electrodes 22 and 25. At this point the concerned can is grasped by the gauged rollers 1, 2, 3, 4 and caused to move forward by the powered ones 1, 2, 3 while the electrodes 22 and 25 carry out the welding operation. Immediately afterwards, the concerned can is taken by the belts 6 and 26 which cause it to move past the shaping and cutting devices, again without the use of the electrodes 22 and 25.

Practically many modifications and improvements such as the independent powering of each powered gauged roller 1, 2 and 3, are possible provided that they do not depart from the spirit and scope of the invention as defined in the appended claims.

What is claimed is:

1. A device for shaping cylindrical containers to a standard size suitable to be fed to a continuous welder, comprising several sets of shaping rollers, each set of rollers being disposed along a circumference of an opening receiving tin plates, the rollers of at least one of said sets being provided with gauged surfaces and innerly defining said opening having the same diameter as the cylindrical container which is to be shaped, means for powering one or more of said gauged rollers at a constant speed, a set of belts entraining welded cylindrical containers, at least one of said entraining belts being powered at a constant speed, wherein said powered belt is an innerly toothed belt and wherein one of said powered gauged rollers is provided, on its gauged surface, with teeth designed for meshing with the belt, said belt having an outer surface opposite said teeth for establishing the gauged surface of the toothed region of said powered gauged roller.

2. The shaping device according to claim 1, wherein only one of said gauged rollers is powered and wherein said powered gauged rollers are provided with respective teeth allowing them to mesh with the adjoining powered gauged roller.

3. The shaping device according to claim 1, wherein a cleaning element is pressed against at least one of said powered gauged rollers.

* * * * *